US010466663B2

(12) United States Patent
Soo et al.

(10) Patent No.: US 10,466,663 B2
(45) Date of Patent: Nov. 5, 2019

(54) SYSTEMS, METHODS AND APPARATUS FOR AN IMPROVED INTERFACE TO ENERGY MANAGEMENT SYSTEMS

(71) Applicant: Siemens Industry, Inc., Alpharetta, GA (US)

(72) Inventors: Jo S. Soo, Minnetonka, MN (US); Jeff Walz, Maple Grove, MN (US); Tuan Le, Plymouth, MN (US); Touhid Khan, Eden Prairie, MN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 700 days.

(21) Appl. No.: 14/870,127

(22) Filed: Sep. 30, 2015

(65) Prior Publication Data
US 2016/0216875 A1    Jul. 28, 2016

Related U.S. Application Data

(60) Provisional application No. 62/106,285, filed on Jan. 22, 2015.

(51) Int. Cl.
| | |
|---|---|
| *G05B 15/02* | (2006.01) |
| *G06F 3/0484* | (2013.01) |
| *G06F 3/0488* | (2013.01) |
| *G06F 3/0482* | (2013.01) |
| *H02J 3/00* | (2006.01) |

(52) U.S. Cl.
CPC .......... *G05B 15/02* (2013.01); *G06F 3/0482* (2013.01); *G06F 3/04842* (2013.01); *G06F 3/04886* (2013.01); *H02J 3/00* (2013.01)

(58) Field of Classification Search
CPC .............. G06F 3/0482; G06F 3/04842; G06F 3/04886; H02J 3/00; G05B 15/02
USPC ........................................................ 715/734
See application file for complete search history.

(56) References Cited

U.S. PATENT DOCUMENTS

| | | | |
|---|---|---|---|
| 6,067,477 A * | 5/2000 | Wewalaarachchi .. | G05B 19/418 700/17 |
| 8,626,344 B2 | 1/2014 | Imes et al. | |
| 9,035,888 B1 * | 5/2015 | DeLatorre ........... | G06F 3/04886 345/173 |
| 2010/0325568 A1* | 12/2010 | Pedersen ........... | G06F 17/30994 715/765 |
| 2011/0191722 A1* | 8/2011 | Gill ........................ | G06Q 10/20 715/841 |
| 2012/0136499 A1 | 5/2012 | Jang | |
| 2013/0338842 A1 | 12/2013 | Fukuzawa | |
| 2014/0337791 A1* | 11/2014 | Agnetta ................ | G06F 3/0481 715/784 |

\* cited by examiner

*Primary Examiner* — John T Repsher, III

(57) ABSTRACT

Embodiments provide systems, methods and apparatus for a computer implemented graphical user interface (GUI) for monitoring and controlling an energy management system (EMS) in real time. The GUI includes a card carousel GUI control wherein the card carousel GUI control includes a plurality of cards arranged in a sequence, each card displaying a unique set of status information about related EMS parameters, wherein the unique set of status information of each card is concurrently visible. Numerous other aspects are provided.

13 Claims, 8 Drawing Sheets

SYSTEMS, METHODS AND APPARATUS FOR AN IMPROVED INTERFACE TO ENERGY MANAGEMENT SYSTEMS

RELATED APPLICATIONS

The present application claims priority to U.S. Provisional Application No. 62/106,285 titled "Energy Management System HUD A Real-Time Dashboard" filed Jan. 22, 2015, which is incorporated herein by reference for all purposes.

FIELD

The present invention relates to operating energy delivery systems, and more specifically to an improved interface to energy management systems.

BACKGROUND

An energy management system (EMS) is a system of computer implemented tools used by operators of electric utility grids to monitor, control, and optimize the performance of the generation and/or transmission of an energy delivery system. In other words, an EMS is used to optimize, supervise and control the transmission grid, generation assets, and in some cases, the loads. The monitoring and control functions are known as "supervisory control and data acquisition" (SCADA). Control of such a system can involve autonomous automatic control actions by the EMS to arrest deviations in power system frequency whenever imbalances arise between loads and generation. However, the system is overseen by human operators who must control numerous functions in real time to insure correct and continuous operation of the system. The system includes numerous sub-systems and involves significant complexity both in terms of the vast amount of real time status information generated by the sub-systems and the sheer size of the electrical networks controlled which can include many thousands of nodes and several thousand generating units. Operators must undergo significant training to become qualified to run an EMS and even then, responding to the overwhelming amount of status information in real time is challenging. For example, operator error was identified as a contributory cause of the 2003 North American blackout and other power failures. Thus, there is a significant need to provide systems, methods and apparatus for an improved interface to energy management systems.

SUMMARY

In some embodiments, a method of controlling an energy delivery system is provided. The method includes providing an energy management system (EMS) communicatively coupled to a plurality of generating units, the EMS including a human machine interface (HMI) service, the HMI service including a graphical user interface (GUI) application; monitoring a plurality of parameters of the EMS in real time using a card carousel GUI control wherein the card carousel GUI control includes a plurality of cards arranged in a sequence, each card displaying a unique set of status information about related EMS parameters, wherein the unique set of status information of each card is concurrently visible; and responding to EMS status changes based upon the monitored parameters of the EMS.

In other embodiments, a system is provided. The system includes a process controller; a memory coupled to the process controller and storing instructions executable on the process controller, the instructions operable to cause the processor to: display a plurality of parameters of the EMS in real time using a card carousel GUI control wherein the card carousel GUI control includes a plurality of cards arranged in a sequence, each card displaying a unique set of status information about related EMS parameters, wherein the unique set of status information of each card is concurrently visible; and provide access to applications for responding to EMS status changes based upon the displayed parameters of the EMS.

In still other embodiments, a computer implemented graphical user interface (GUI) for monitoring and controlling an energy management system (EMS) in real time is provided. The GUI includes a card carousel GUI control wherein the card carousel GUI control includes a plurality of cards arranged in a sequence, each card displaying a unique set of status information about related EMS parameters, wherein the unique set of status information of each card is concurrently visible.

Numerous other aspects are provided in accordance with these and other aspects of the invention. Other features and aspects of the present invention will become more fully apparent from the following detailed description, the appended claims and the accompanying drawings.

DESCRIPTION

Embodiments of the present invention provide systems, apparatus and methods for an improved interface to energy management systems. The interface can be embodied as a computer application that provides users an overview or "dashboard" of the current state of the controlled or managed electrical grid and an up-to-date understanding of the conditions at hand including "situation awareness" with simple actionable intelligence. Embodiments of the invention also provide a direct point-of-entry into either or both an Energy Management System (EMS) and/or a Distribution Management System (DMS). In addition, embodiments of the present invention can be used for other systems as well such as, for example, an Outage Management System (OMS) or a Workforce Management System (WMS). In some embodiments, the interface is specifically adapted to operate in conjunction with an EMS application suite to manage power grids. The interface is designed to simplify work processes and facilitate efficient data management. The interface can be configured per system per user for optimal operation reflecting business processes that may be operator-specific (e.g., ISOs, utilities, independent power producers (IPP), non-utility generators (NUG), etc.).

Due to the complexity of the multiple systems that a power/electric grid operator is exposed to, as well as the myriad real time status information from these systems, embodiments of the invention are designed and created to help the operators make sense of the numerous parameters characterizing the condition of the network by providing users with relevant, contextual information at the right time. Embodiments also provide a streamlined interface for operators to put tasks and workflows "on hold" (e.g., to handle higher priority tasks or interruptions) and to quickly resume the on-hold tasks and workflows when needed.

Embodiments of the invention are also designed to provide a high level of situational awareness to operators while directing their attention to what is most important at any given moment. The interface supports both visual and audible signalization including blinking/flashing, color variation, sounds, and automatic dial movement (e.g., to specific numbers and colors) reflecting internal calculations. In some embodiments, a composite of graphical user interface (GUI) controls and status indicators are provided in a dashboard format that includes rotatable carousel-like card display, a series of informational status dials, a thumb arc GUI control, and a workflow management GUI control. The dashboard can be implemented as a cross-platform, touch screen-enabled interface for use, e.g., with a tablet computer, a touch screen personal computer, and/or a gesture sensor (for example, the Leap Motion Controller manufactured by Leap Motion, Inc.) coupled to a personal computer.

Figure 1:
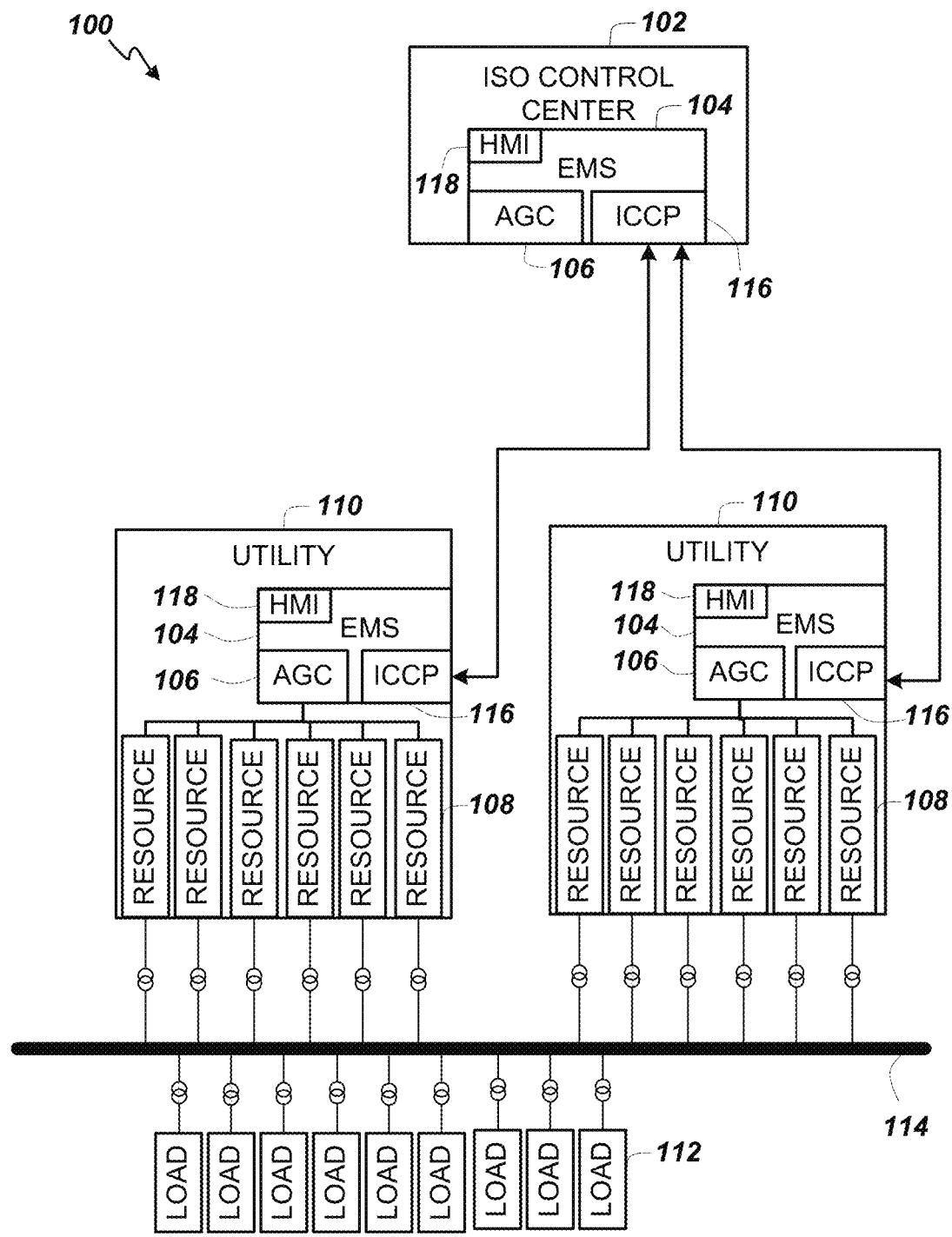
FIG. 1 is a block diagram depicting a portion of an example power distribution system according to embodiments of the present invention.

Turning now to FIG. 1, a portion of an example energy deliver system 100 according to embodiments of the present invention is provided. In some embodiments, for example, Independent System Operators (ISO) 102 operate control centers that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG), etc.), in response to changes in the load created by consumers of the electricity. The generated power is delivered from the resources 108 to power consumers' loads 112 via transmission lines 114. Note that the utilities 110 can include an EMS 104 with an AGC system 106. To facilitate communications and control between the EMSs 104, the EMSs 104 also implement an inter-control center protocol (ICCP) 116. A human-machine interface (HMI) service 118 within the EMSs 104 provides operator access to the data and control of the EMSs 104.

Embodiments of the present invention in the form of a HMI application can be added to existing commercially available EMS products such as the Spectrum Power 3™, Spectrum Power 7™, and the Spectrum Power TG™ Energy Management Systems manufactured by Siemens Industry, Inc. of Washington, D.C.

Since a power grid requires that generation and load closely balance moment by moment, frequent adjustments to the output of resources 108 are continuously made. The balance can be judged by measuring the system frequency; if system frequency is increasing, more power is being generated than used, and the generators in the system 100 are accelerating. If the system frequency is decreasing, more load is on the system 100 than the instantaneous generation can provide, and the generators in the system 100 are slowing down.

Where the grid has tie interconnections to adjacent control areas, the AGC system 106 helps maintain the power interchanges over the tie lines at the scheduled levels. With computer-based control systems and multiple inputs, an AGC system 106 can take into account such matters as the most economical units to adjust, the coordination of thermal, hydroelectric, wind, and other generation types, and constraints related to the stability of the system and capacity of interconnections to other power grids. Via the HMI application, operators not only program the AGC but also monitor and oversee its operations and intervene when necessary.

Figure 2:
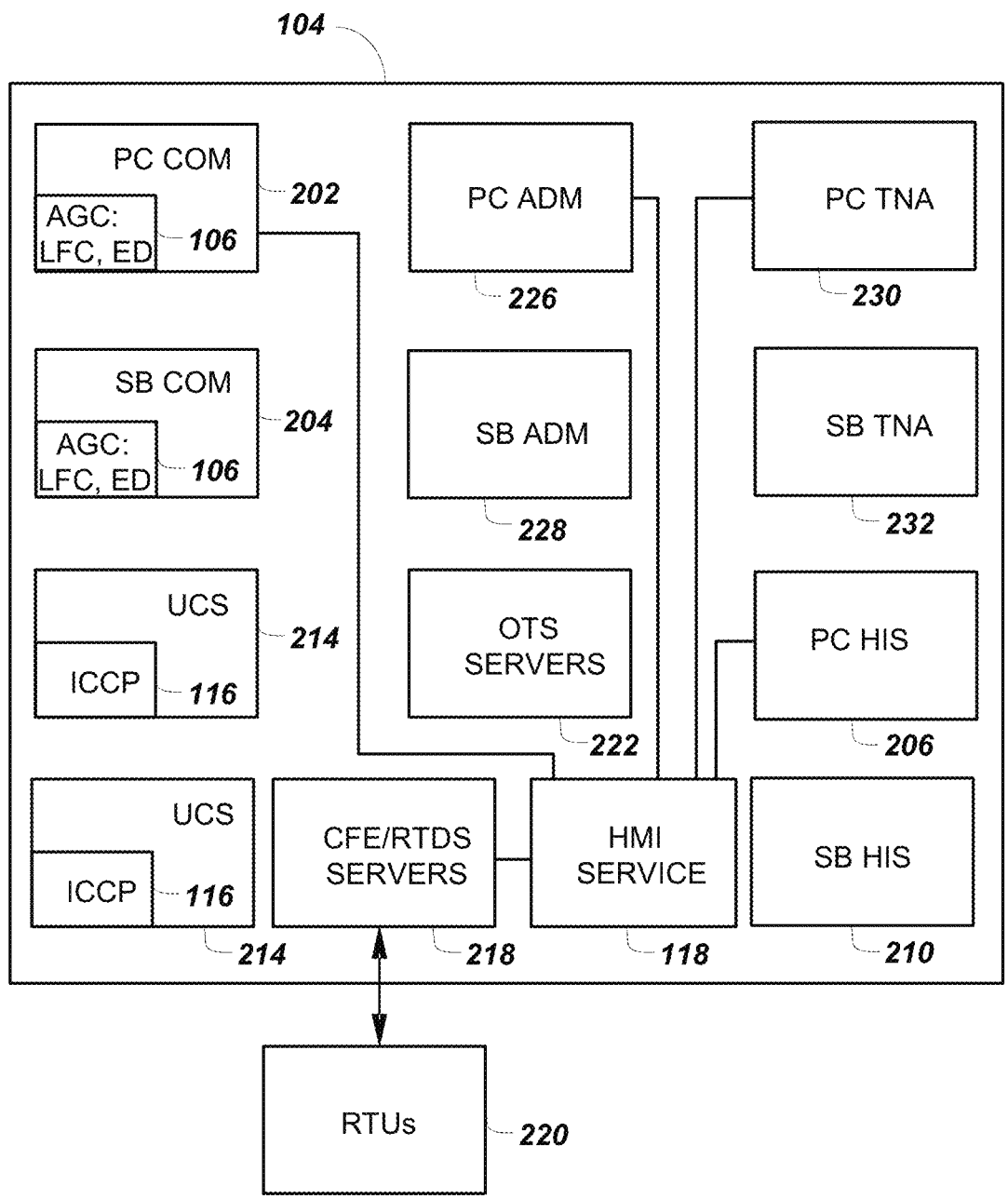
FIG. 2 is a block diagram depicting details of an example energy management system (EMS) according to embodiments of the present invention.

Turning now to FIG. 2, an example configuration of an EMS 104 (e.g., an EMS 104 operated by an ISO) that includes an improved HMI service 118 according to embodiments of the present invention is shown. While the EMS 104 is described as an example of a real time system that can present information in a useable and timely manner to enable users to take appropriate action with minimized complexity, it should be understood that other systems can also supply such information and the EMS 104 is merely used as an illustrative, non-limiting example. Within the EMS 104, the AGC system 106 can be implemented within a Process Controller (PC) server 202 that also includes Communicator (COM) functionality. The AGC system 106 can include a Load Frequency Control (LFC) module and an Economic Dispatch (ED) module. The EMS 104 can include redundant back-up servers to provide higher reliability and fault-tolerance. Thus, a Standby (SB) server 204 with COM functionality is also provided in some embodiments. A PC server 206 that implements a Historical Information System (HIS) and a SB server 210 that implements a backup HIS can be included in the EMS 104 as well.

EMS 104 further includes one or more Utility Communication Servers 214 that each provide an implementation of an Inter-Control Center Communication Protocol (ICCP) 116 that enables communication with, for example, other EMSs in operation at, for example, several utilities 110 (FIG. 1). In some embodiments, ICCP 116 can be used to implement remote control of resources 108 (FIG. 1) by implementing AGC system 106 communications between different EMSs. The EMS 104 also includes a communication front end (CFE)/Real Time Data Server (RTDS) 218 to facilitate communications with external entities and users via remote terminal units (RTUs) 220. Note that RTUs 220 are part of the power utilities' field devices, for example. In some embodiments, the EMS 104 can also include a number of additional servers and applications. For example, the EMS 104 can include Operator Training Simulator (OTS) servers 222, a PC Administration (ADM) application server 226, a SB ADM application server 228, a PC Transmission Network Application (TNA) 230, and a SB TNA 232.

The HMI Service 118 can be coupled to the RTDS 218 to allow users access to the real time and historical data that is used to populate the GUI controls and status displays of embodiments of the present invention. In some embodiments, the HMI Service 118 can also be coupled to real time, operational databases within the PC server 202, the ADM application server 226, and the TNA 230, as well as the historical database within the PC server 206.

In operation, the ISO clears the real time market through its market optimization engine and then ISOs dispatch instructions along with ancillary service awards (e.g., regulation, reserves, etc.) to individual power utilities through a transport mechanism (e.g., ICCP 116). The power utilities receive the dispatch instructions (e.g., via ICCP 116) and then make use of their AGC system 106 (e.g., via the HMI service 118) to compute a power setpoint command for each AGC cycle for the resources under AGC control (i.e., AGC units). Next, the setpoints are updated to SCADA and they are then sent to the utilities' RTUs 220 via the CFE/RTDS 218. There are dedicated RTU lines that connect the RTUs to the CFE/RTDS 218 via, e.g., modems. RTUs can be geographically located in the utilities' substations and hard-wired to the resources (e.g., generators). The various applications such as, for example, AGC system 106, SCADA, CFE/RTDS 218, and ICCP 116 are part of EMS 104 and can be accessed via the HMI service 118. The RTUs 220 are field devices that are capable of sending telemetry to the ISO EMS 104 and can also receive megawatt (MW) setpoints from the ISO EMS 104 to control resources (e.g., generators).

In some embodiments, the hardware and operating environment for the HMI service 118 includes a general purpose computing device in the form of a computer (e.g., a personal computer, laptop, tablet, smartphone, workstation, server, or other processor-based device), including one or more processing units, a system memory, and a system bus that operatively couples various system components including the system memory to the processing unit. There may be one or more processing units, such that the processor of the computer comprises a single central-processing unit (CPU), or a plurality of processing units, commonly referred to as a multiprocessor or parallel-processor environment. A multiprocessor system can include cloud computing environments. In various embodiments, the computer is a conventional computer, a distributed computer, or any other type of computer.

The system bus can be any of several types of bus structures including a memory bus or memory controller, a peripheral bus, and a local bus using any of a variety of bus architectures. The system memory can also be referred to as simply the memory, and, in some embodiments, includes read-only memory (ROM) and random-access memory (RAM). A basic input/output system (BIOS) program, containing the basic routines that help to transfer information between elements within the computer, such as during start-up, may be stored in ROM. The computer can further include a hard disk drive for reading from and writing to a hard disk, a solid state drive (SSD) for reading from or writing to electronic non-volatile storage, and an optical disk drive for reading from or writing to a removable optical disk such as a DVD ROM or other optical media.

The hard disk drive, SSD, and optical disk drive couple with a hard drive interface, a SSD interface, and an optical disk drive interface, respectively. The drives and their associated computer-readable media provide non-volatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, SSD, optical disk, ROM, or RAM, including an operating system, one or more application programs, other program modules, and program data. A plug in containing a security transmission engine for embodiments of the present invention can be resident on any one or number of these computer-readable media.

A user may enter commands and information into the computer through input devices such as a keyboard and pointing device, a touch screen, and/or a gesture sensor. Other input devices can include a microphone, joystick, game pad, scanner, or the like. These other input devices are often connected to the processing unit through a serial port interface that is coupled to the system bus, but can be connected by other interfaces, such as a parallel port, game port, or a universal serial bus (USB). A monitor or other type of display device can also be connected to the system bus via an interface, such as a video adapter. The monitor can display a graphical user interface including color and animation for the user. In addition to the monitor, the computer can include other peripheral output devices, such as audio speakers and printers.

The computer may operate in a networked environment using logical connections to one or more remote computers or servers, such as a remote computer. These logical connections are achieved by a wired or wireless communication device coupled to or a part of the computer; embodiments of the invention are not limited to a particular type of communications device. The remote computer can be another computer, a server, a router, a network PC, a client, a peer device or other common network node, and can include many or all of the elements described above relative to the computer. The logical connections can include a local area network (LAN) and/or a wide area network (WAN). Such networking environments can exist in office networks, enterprise-wide computer networks, intranets and the Internet, which are all types of networks.

When used in a LAN-networking environment, the computer is connected to the LAN through a wired or wireless network interface or adapter, which is one type of communications device. In some embodiments, e.g., when used in a WAN-networking environment, the computer can include a modem (another type of communications device) or any other type of communications device, e.g., a wireless transceiver, for establishing communications over the wide-area network, such as the Internet or a private, dedicated and secure network. The modem, which can be internal or external, can be connected to the system bus via the serial port interface. In a networked environment, program modules depicted relative to the computer can be stored in the remote memory storage device of a remote computer, or server. It is appreciated that the network connections described are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Figure 3A:
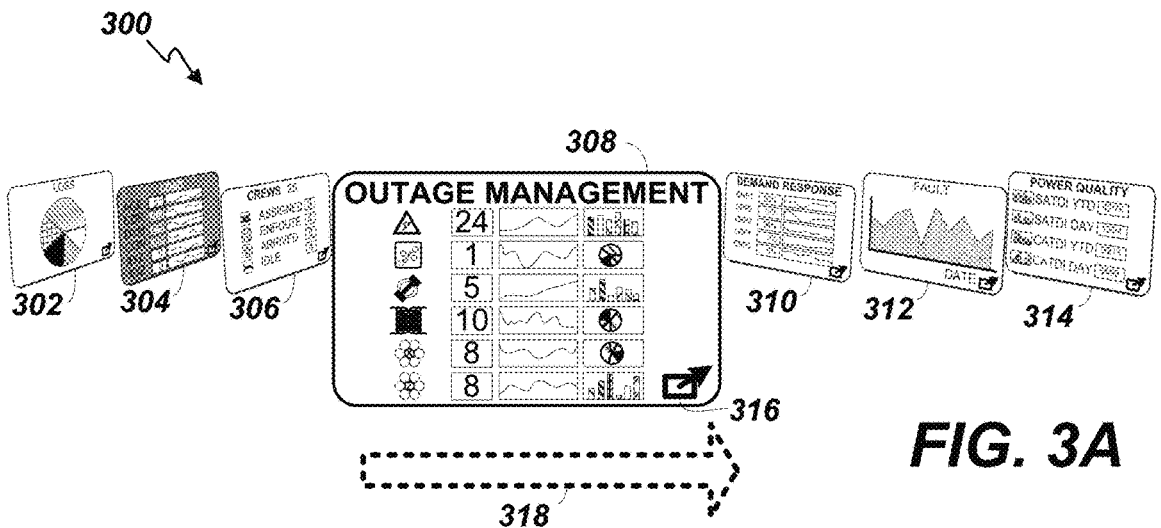
FIGS. 3A to 3C are an example display of a carousel card graphical user interface (GUI) control according to embodiments of the present invention.
Figure 3B:
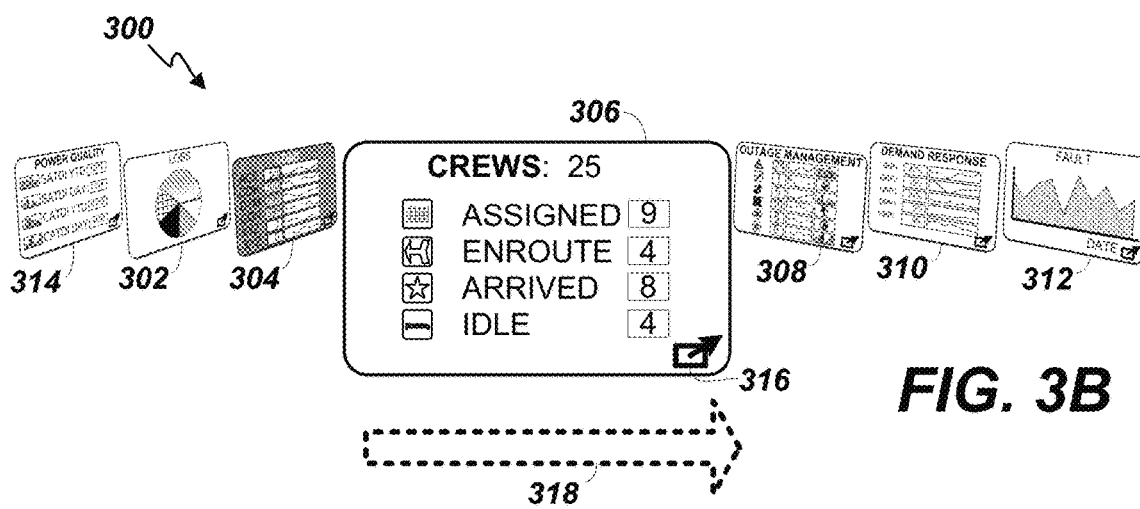
Figure 3C:
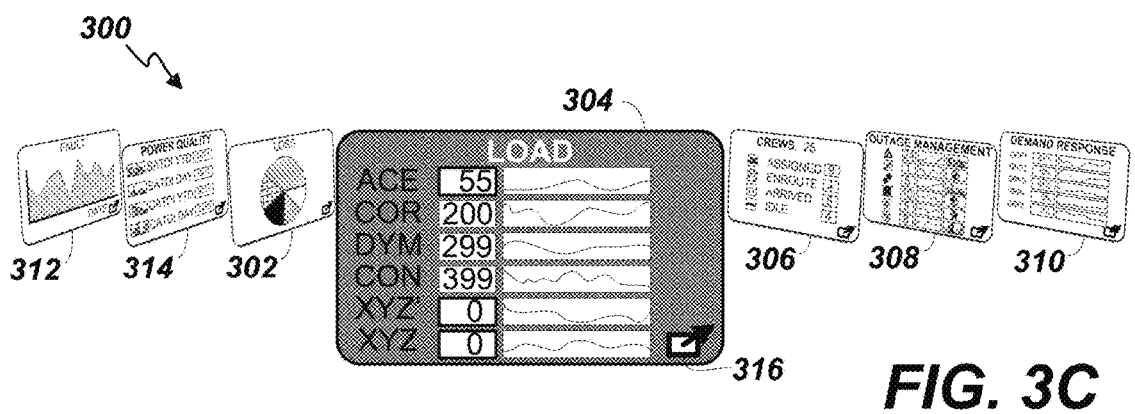

Turning now to FIGS. 3A through 3C, an example carousel card GUI control 300 is depicted. The example carousel card GUI control 300 includes seven cards: a loss card 302, a load card 304, a crews card 306, an outage management card 308, a demand response card 310, a fault card 312, and a power quality card 314. However, the carousel card GUI control 300 can include any number of cards and, for example, in alternative embodiments, different carousel card GUI controls 300 include three, five, and nine cards. Further, the particular cards shown merely represent examples of possible cards that could be used. Many different types of cards displaying different information can be used. Each card can include a set of status information about a collection of related EMS parameters. In some embodiments, the cards also include input fields for entering values to make changes to the EMS. The carousel card GUI control 300 provides quick access to multiple different sets of information while concurrently allowing visualization of all the different sets of information.

In operation, the user can, for example, click on any of the cards and an animation rotates the selected card to the center position. The other cards remain fully visible but are skewed so as to appear to be aligned with their longitudinal dimension along a radial "spoke" extending from a center of rotation of the invisible carousel. In some embodiments, the center card is magnified as show in FIGS. 3A to 3C. In alternative embodiments, the card in the center position is displayed in the same size as the other cards. In some embodiments the off-center cards can partially overlap but still allow visualization of the information on the off-center cards. In some embodiments, the cards are not skewed and simply face forward like the center card even when in off-center positions.

In some embodiments as shown, each card includes an expand icon 316 or button (e.g., an arrow extending out of a box in the lower right corner of the card) that, when selected, causes a more detailed version of the particular card to be displayed on a larger window of the display screen.

In some embodiments, a swipe gesture on a touch screen (e.g., as indicated by dashed arrow 318) will cause the cards to rotate. The carousel card GUI control 300 can be configured by the user to allow the cards to rotate based on how fast and/or how long the swipe gesture is made or, alternatively, only one card position at a time. In any event, an audible click can be played each time a card passes by the center position. In some embodiments, the animation of the rotation can be implemented to make it appear that the carousel includes a detent so that the cards always come to rest with a single card centered in the center position. In some embodiments, clicking (e.g., selecting a card with a pointing device or tapping a card via a touch screen) on any card will cause an animation to execute that rotates the selected card to the center position.

Figure 3D:
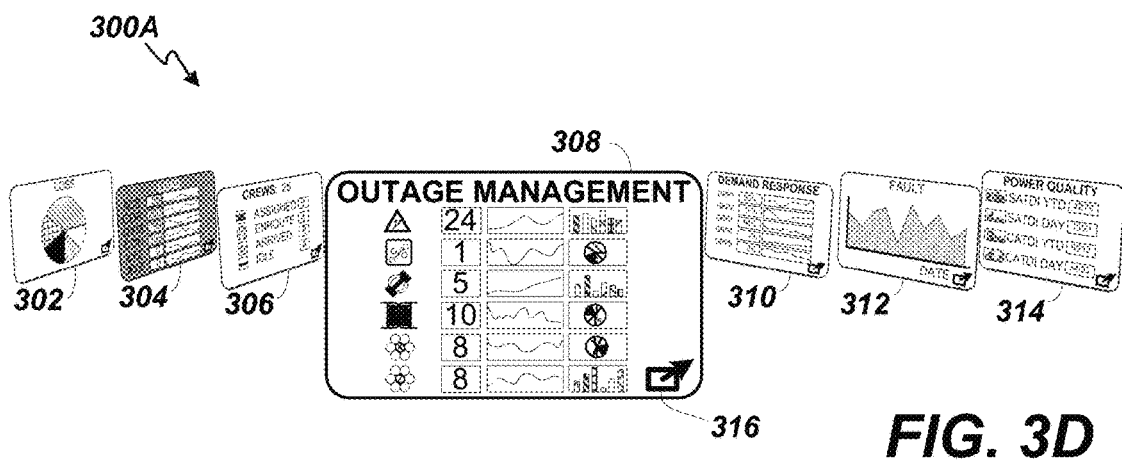
FIGS. 3D and 3E are an example display of a "focus" card graphical user interface (GUI) control according to embodiments of the present invention.
Figure 3E:
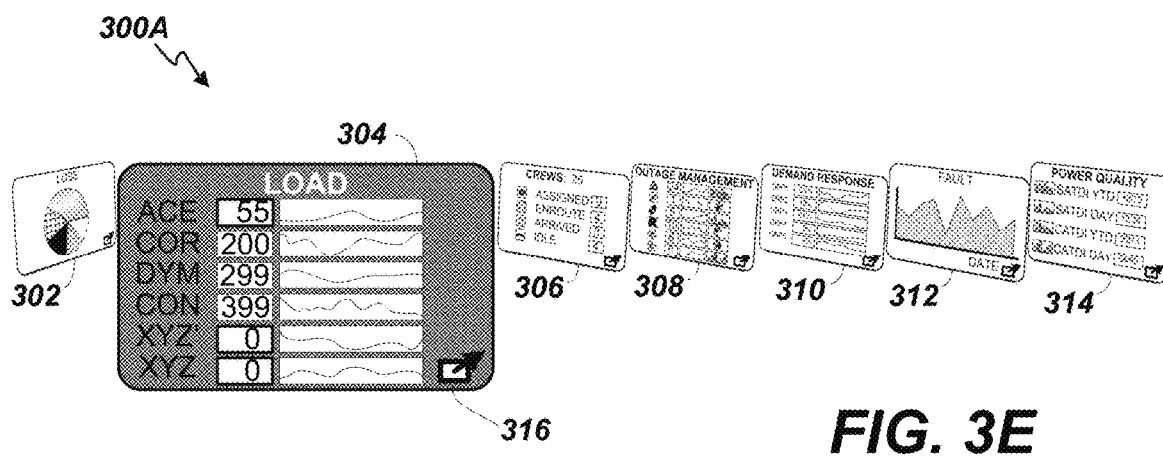

In some alternative embodiments as illustrated in FIGS. 3D and 3E, instead of simulating rotation of the cards on a carousel, when a particular card is selected, it becomes the "focus" card, moves to the foreground and is enlarged. In this focus card GUI control 300A, a newly selected focus card maintains its position relative to the other cards. The previous focus card is reduced in size and moved to the background. Thus, for example, in FIG. 3D, the outage management card 308 is the focus card. Once a user clicks on or otherwise selects the load card 304, the outage management card 308 shrinks down to the background and the load card 304 enlarges to become the new focus card. Movement of the cards is minimized to further help the user maintain his orientation and understanding of where the information he needs can be located. In other words, for example, switching back to the outage management card 308 is intuitive, fast and easy because it is easily recognizable and where the user last saw it, just smaller.

Embodiments of the present invention enhance a user's situational awareness of the EMS (and consequently the energy distribution system), by continually updating status information on the off-center cards (or background cards) as well as the card in the center position (or the "focus" card). Thus, even if the user is primarily focused on the card in the center position (or focus card), the cards in the off-center position (or background) display "live", real time status that the user can still see. Further, the user's situational awareness is further enhanced by being able to fully see each of the off-center cards (or background cards) even while they are in off-center positions (or not the focus card). In some embodiments, the use of color, sound, and flashing/blinking can also be used to draw the user's attention to a card in an off-center position (or the background). For example, referring back to FIGS. 3A to 3C, assume that under normal operating conditions, all of the cards normally have a white background. However, due to a condition requiring operator attention, the colors of the load card 304 in FIG. 3A have been inverted so as to have a dark background. With two quick swipes (as indicated by the dashed arrow 318 in FIG. 3A and in FIG. 3B), the operator brings the load card 304 to the center position for closer examination as shown in FIG. 3C. Other methods of attracting the operator's attention such as highlighting, enlarging, blinking, and/or coloring the load card 304 can be used. In addition, particular information on the card can be highlighted, enlarged, caused to blink, and/or colored so that the operator can see what the issue is even before the load card is brought to the center position (or to primary focus) for closer inspection.

Thus, embodiments of the present invention further enhance the user's situational awareness and ability to react to real time changing conditions by making the relevant information easily recognizable and readily accessible. In particular, this is done without overwhelming the user with too much information or popping-up out-of-context information in a new window. The card carousel provides context for the information and a frame of reference within which the user can maintain a readily recognizable mental model of the structural organization of the information.

In some embodiments, the cards are configurable for each specific user, the specific user's tasks, and to support the specific user's task flow. In some embodiments, the cards can provide a summarized or more detailed overview of each of the systems with which the specific user interacts (e.g., Outage Management, Mobile workforce Management, alarms, violations, etc.). In some embodiments, the number of cards is limited to five, six or seven cards. The contents of the cards are determined by the needs of the users and the respective systems/tasks. In addition to being configurable, the cards can be icon-based and/or text-based. In other words, the information can be presented and/or labeled using icons, graphics, and/or text, depending on the user's particular preferences. In use, a selected card can be enlarged and the order of the cards on the carousel is maintained, so that the user does not have to switch his eye position or reorient his perspective. Cards corresponding to systems needing attention are highlighted and in some embodiments, the GUI can be configured to automatically rotate the cards to the center position and/or enlarge the card (e.g., in sequence). Alternatively, the GUI can be configured to allow the user to click or select the card to be moved to the center position. It is a further feature of some embodiments of the invention that each card only requires one click (or merely hovering-over the card) to gain access to the corresponding system (e.g., opening an application for the system in a larger window).

Figure 4:
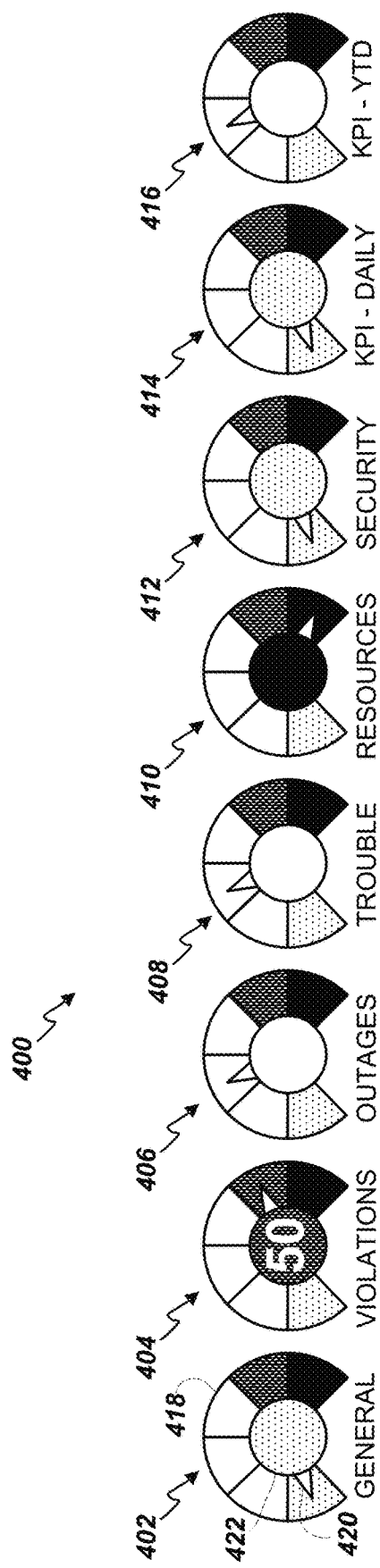
FIG. 4 is an example display of status dial GUI controls according to embodiments of the present invention.

Turning now to FIG. 4, a series of status dial GUI controls 400 are displayed. Each status dial GUI control represents a current, real time status or value of a key parameter of a system under the control or monitoring umbrella of the EMS. While eight status dial GUI controls 400 are depicted, the interface can include any number that is practicable to convey essential information to the user. The status dial GUI controls shown include a general status dial 402, a violations status dial 404, an outages status dial 406, a trouble status dial 408, a resources status dial 410, a security status dial 412, a daily key performance indicator (KPI) status dial 414, and a year to date (YTD) KPI status dial 416. The particular status dials shown merely represent examples of possible status dials that could be used. Many different types of status dials representing different information can be used.

In some embodiments, each status dial GUI control can include a scale 418 (e.g., a color scale, a grey scale, etc.) representing a severity or operating range of the parameter represented. In some embodiments, a color scale ranging from green to red with white, yellow, and orange levels in between is used. On such a color scale, for example, green indicates a good status, red indicates a problem, and the colors in between represent a range from acceptable to potential problem, to imminently impending problem. Other colors, gradations, number of levels, and meanings can be used. A moving needle 420 on the scale 418 can be used to indicate a current status while the direction of movement and speed of movement of the needle 420 can indicate the direction and rate of change of the value of the status dial's representative parameter. In some embodiments, each status dial GUI control can also include a central indicator 422 which can be a color (or shade) and/or text disposed within the scale 418 that reflects a current (or, in some embodiments, an immediately prior) status. For example, in the sample violations status dial 404 shown in FIG. 4, the central indicator 422 includes a numerical value within the central indicator 422.

In some embodiments, the dials are indicators for alarms, KPIs, etc. including rate of change for applicable indicators. As with the violations status dial 404, a current numerical value can be shown within the dials. The status dial GUI controls 400 are novel in that not only do they show the current value of the tracked parameter, but they can also indicate the general direction and rate of change of the value over time (e.g., increasing/decreasing and speed of increment/decrement). These features provide the user with an additional dimension of situational awareness beyond a simple numerical value. For example, the status dial GUI control allows the user to perceive a sense of how quickly the numeric value is changing as well as the operating range of the numeric value (e.g., based on the movement of the needle 420 on the scale 418). In some embodiments, clicking on status dial GUI control summons a detailed view of the underlying, real time information used to determine the current value displayed by the status dial.

Figure 5:
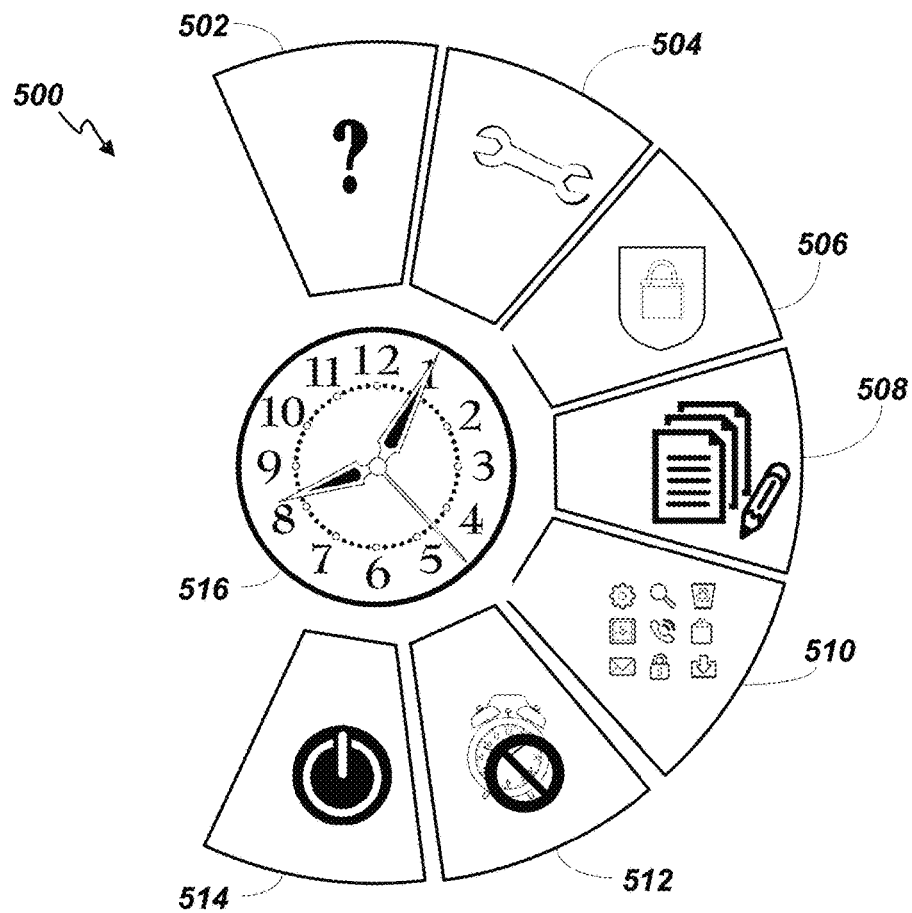
FIG. 5 is an example display of a thumb arc GUI control according to embodiments of the present invention.

FIG. 5 is an example display of a thumb arc GUI control 500. A thumb arc GUI control 500 is a menu-type selector control specifically designed for use on an edge of a touch screen or tablet-style computer. The menu choices are arrayed in an semi-circle, arc pattern scaled to be reachable with the thumb of an average user while holding the touch screen or tablet. Thus, the thumb arc GUI control 500 pictured is adapted to be disposed on the left edge of a touch screen (e.g., tablet, smartphone, etc.) display and the position of the menu choices are positioned to be easily selected using just the user's thumb. In some embodiments, a pointer can be used to operate the thumb arc GUI control 500. The particular example thumb arc GUI control 500 shown in FIG. 5 includes seven menu choices including a help menu choice 502, a setup menu choice 504, a lock menu choice 506, an annotation menu choice 508, an applications menu choice 510, an inhibit audible alarms menu choice 512, and a login/logout menu choice 514. More or fewer menu choices can be used. Likewise the particular types of menu choices are merely representative and any practicable types can be included. The thumb arc GUI control 500 can be configured by the user to include the number, positions, and types of menu choices desired. The thumb arc GUI control 500 can also include a clock 516 (e.g., a user configurable analog or digital clock) and/or calendar (not shown) disposed within the semi-circle of menu choices.

Figure 6:
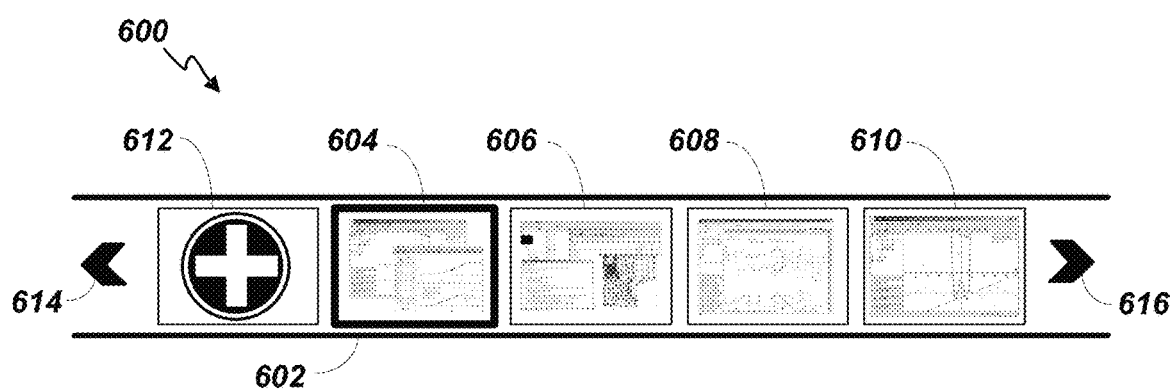
FIG. 6 is an example display of a workflow management GUI control according to embodiments of the present invention.

FIG. 6 is an example display of a workflow management GUI control 600. The workflow management GUI control 600 allows the user to store a set of one or more instances of executing associated programs (and current data files) within a workflow container. The workflow containers are represented by miniaturized views of the windows of the respective workflows. For example, if a workflow involves monitoring a real time graph of a generator's output, calculating associated cost values using a spread sheet, and capturing notes of observations in a database using a client database access program, a miniaturized version of the real time graph, the spreadsheet, and the database access program will be created in a workflow container and displayed on the workflow management bar 602 so that the user can later access the group of programs associated with the workflow without having to manually pull up individual files in the different applications.

In the particular example of FIG. 6, four workflow containers 604-610 are depicted. Any number of workflow containers can be stored in the interface even if only, for example, four are visible at any given time. In some embodiments, additional workflow containers can be scrolled off the workflow management bar 602 temporarily out of sight. Workflow container 604 is selected (e.g., highlighted, as indicated by the thicker outline for example). In some embodiments, clicking on the selected workflow container restores the workflow to the main display window so the user can continue working. Right clicking can bring up a menu that allows the user to delete or archive the workflow container 604. In some alternative embodiments, a symbol (e.g., a small minus sign) appears in a corner (e.g., the top right corner) of a workflow container 604 whenever a pointer hovers over it. Clicking this symbol would delete the associated workflow container 604. Selecting the plus button 612 allows the user to create a new workflow based upon the currently open applications in the main display window. Selecting the left arrow 614 scrolls the workflow containers to the left and selecting the right arrow 616 scrolls the workflow container to the right.

Thus, the workflow management GUI control 600 provides the user with quick and convenient access to existing workflows. Each active workflow is represented by a miniaturized view of the workflow as it was last seen by the user. The user can swiftly sort through the stored workflow containers by visual identification using the miniature view and/or by the name and description assigned to the workflow, which can be presented as mouse-over text. Once the desired workflow is found, the user can select it with a single click to restore the user's workspace to include each view/window as it was last accessed by the user for the specific workflow.

In addition, the workflow containers can also be highlighted based on a number of criteria, such as a change in state of a device (e.g., a resource, a system, a utility, etc.) directly linked to the workflow, a prolonged duration of inactivity, or an outage duration which has surpassed the original estimated time of restoration. This highlight can be represented by, for example, coloring the frame around the workflow container with a color indicating the severity of the situation (e.g., yellow warning, orange impending problem, and red actual problem).

Figure 7:
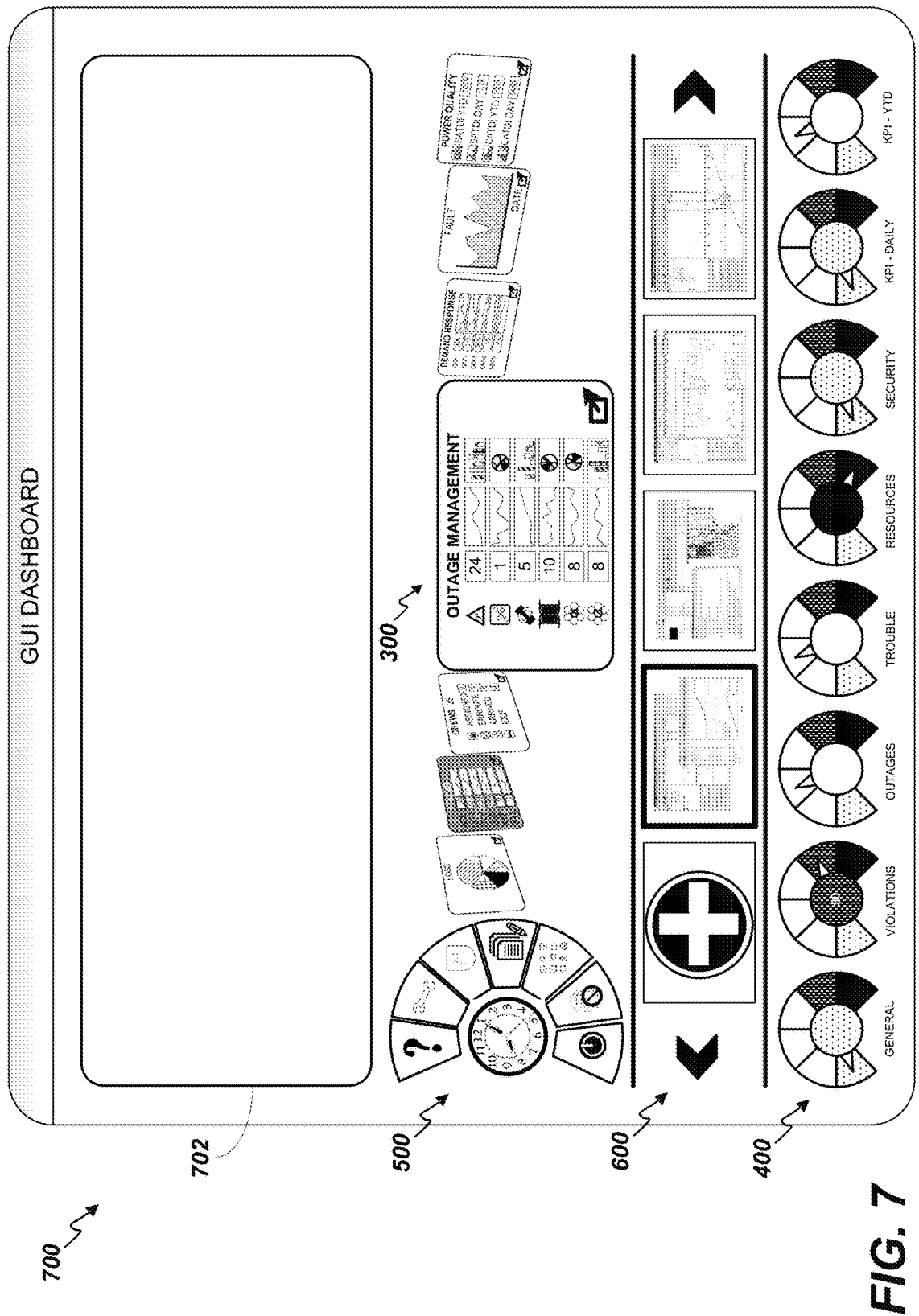
FIG. 7 is an example display of a first composite GUI dashboard according to embodiments of the present invention.

FIG. 7 is an example display of a composite GUI dashboard 700. The particular example arrangement includes all of the above-described GUI controls disposed at a lower portion of the display which allows an upper portion to be used as a main display window 702 available for user workflow applications and/or detail displays associated with components of the GUI controls. The example composite GUI dashboard 700 of FIG. 7 includes the card carousel GUI control 300, the status dial GUI controls 400, the thumb arc GUI control 500, and the workflow management GUI control 600. Other arrangements are possible.

Figure 8:
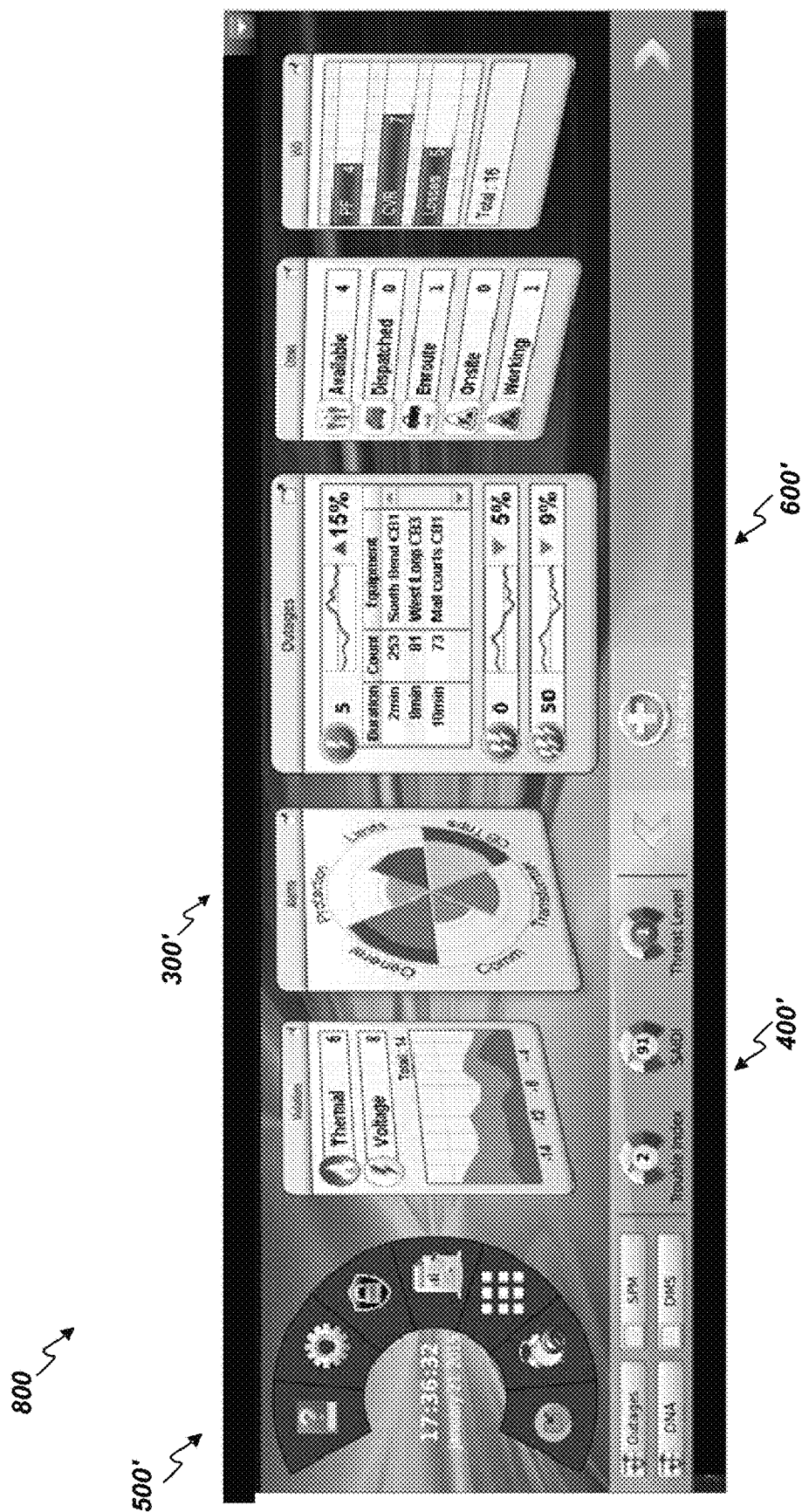
FIG. 8 is an example display of a second composite GUI dashboard according to embodiments of the present invention.

FIG. 8 is an example of a second composite GUI dashboard 800. The example composite GUI dashboard 800 of FIG. 8 includes a card carousel GUI control 300', status dial GUI controls 400', a thumb arc menu GUI control 500', and a workflow management GUI control 600'. Other arrangements and features are possible.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of controlling a plurality of electric generating units to maintain a balance between electricity load and electricity generation in an energy delivery system via a human machine interface (HMI), the method comprising:
   providing an energy management system (EMS) communicatively coupled to the plurality of electric generating units, the EMS including the HMI;
   monitoring, by the EMS, a plurality of parameters of the energy delivery system in real time, wherein the plurality of parameters represents a status of the energy delivery system;
   generating and displaying, by the HMI, an interactive card carousel wherein the interactive card carousel includes a plurality of cards arranged in a sequence, each card of the plurality of cards displaying a unique set of real time status information about related energy delivery system parameters, wherein the unique set of real time status information of each card of the plurality of cards is concurrently visible;
   generating and displaying, by the HMI, at an edge portion of a touch screen, at least one thumb arc control configured to receive human operator input;
   generating and displaying, by the HMI, a plurality of status dials; and
   responding, by the EMS, to energy delivery system status changes based at least in part on the plurality of parameters of the energy delivery system, and at least in part on one or more operator inputs received via one or more of the interactive card carousel and the at least one thumb arc control;
   wherein generating and displaying by the HMI includes blinking, flashing, varying color from a first color to a second color, or any combination thereof, of the interactive card carousel, the at least one thumb arc control, the plurality of status dials, or any combination thereof based on a real time priority of communicating a respective content to a human operator, and
   wherein responding to the energy delivery system status changes comprises controlling at least one of the plurality of electric generating units.

2. The method of claim 1, wherein generating and displaying the interactive card carousel includes displaying a card of the plurality of cards in a center position of the interactive card carousel and displaying a remainder of the plurality of cards in off-center positions.

3. The method of claim 2, wherein generating and displaying the interactive card carousel further includes magnifying the card of the plurality of cards displayed in the center position.

4. The method of claim 1, wherein each status dial of the plurality of status dials includes a scale indicating an operating range of at least one parameter of the plurality of parameters of the energy delivery system.

5. The method of claim 1, wherein responding to the energy delivery system status changes includes receiving human operator input via the at least one thumb arc control.

6. The method of claim 1, wherein responding to the energy delivery system status changes includes creating a workflow container operative to store one or more instances of EMS applications.

7. An energy management system (EMS) including a human machine interface for controlling a plurality of electric generating units to maintain a balance between electricity load, and electricity generation in an energy delivery system, comprising:
- a processor; and
- a memory coupled to the processor, the memory having instructions stored therein that, when executed by the processor, cause the processor to:
  - monitor a plurality of parameters of the energy delivery system in real time, wherein the plurality of parameters represents a status of the energy delivery system;
  - generate and display an interactive card carousel including a plurality of cards arranged in a sequence, each card of the plurality of cards displaying a unique set of real time status information about related energy delivery system parameters, wherein the unique set of real time status information of each card of the plurality of cards is concurrently visible;
  - generate, and display at an edge portion of a touch screen, at least one thumb arc control configured to receive human operator input, wherein the at least one thumb arc control includes a plurality of wedge-shaped icons arranged sequentially along an arcuate path;
  - generate, and display on the touch screen, a plurality of status dials;
  - receive, via at least one of the interactive card carousel and the at least one thumb arc control, human operator input;
  - respond to energy delivery system status changes based at least in part on the plurality of parameters of the energy delivery system and the received human operator input, wherein responding to the energy delivery system status changes comprises controlling at least one of the plurality of electric generating units; and
  - perform situational awareness actions on the touch screen including blinking, flashing, varying color from a first color to a second color, or any combination thereof, of the interactive card carousel, the at least one thumb arc control, the plurality of status dials, or any combination thereof based on a real time priority of communicating a respective content to a human operator.

8. The energy management system of claim 7, wherein the instructions, when executed by the processor further cause the processor to display a card of the plurality of cards in a center position of the interactive card carousel, and to display a remainder of the plurality of cards in off-center positions.

9. The energy management system of claim 8, wherein the instructions, when executed by the processor further cause the processor to magnify the card of the plurality of cards displayed in the center position.

10. The energy management system of claim 7, wherein each status dial of the plurality of status dials includes a scale indicating an operating range of at least one parameter of the energy delivery system parameters.

11. The energy management system of claim 7, wherein the instructions, when executed by the processor further cause the processor to provide access to one or more applications responsive to human operator input via the at least one thumb arc control.

12. The energy management system of claim 11, wherein the instructions, when executed by the processor further cause the processor to provide a workflow container operative to store one or more instances of the one or more applications.

13. The method of claim 1, wherein generating and displaying by the HMI further includes generating and producing audio alerts.

\* \* \* \* \*